(12) United States Patent
Winter

(10) Patent No.: US 10,676,937 B2
(45) Date of Patent: Jun. 9, 2020

(54) SUPPORT SYSTEM PIVOTING BRACKET AND RAMP ASSEMBLY INCLUDING SAME

(71) Applicant: Homecare Products, Inc., Algona, WA (US)

(72) Inventor: Ronald S. Winter, Pacific, WA (US)

(73) Assignee: Homecare Products, Inc., Algona, WA (US)

( * ) Notice: Subject to any disclaimer, the term of this patent is extended or adjusted under 35 U.S.C. 154(b) by 0 days.

(21) Appl. No.: 16/165,507

(22) Filed: Oct. 19, 2018

(65) Prior Publication Data

US 2019/0119922 A1    Apr. 25, 2019

Related U.S. Application Data

(60) Provisional application No. 62/574,659, filed on Oct. 19, 2017.

(51) Int. Cl.
*E04F 11/00* (2006.01)
*E04F 11/02* (2006.01)
*F16M 13/02* (2006.01)

(52) U.S. Cl.
CPC ............ *E04F 11/002* (2013.01); *E04F 11/02* (2013.01); *F16M 13/022* (2013.01); *E04F 2011/007* (2013.01)

(58) Field of Classification Search
CPC ... E04F 11/002; E04F 11/02; E04F 2011/007; E04F 11/17; E04F 11/112; E04F 11/18
See application file for complete search history.

(56) References Cited

U.S. PATENT DOCUMENTS

| | | | | |
|---|---|---|---|---|
| 3,628,677 A | * | 12/1971 | Cislaw | B60P 3/1008 414/462 |
| 7,607,186 B1 | * | 10/2009 | Mitchell | E04F 11/002 14/69.5 |
| 8,191,193 B2 | * | 6/2012 | Bailie | B65G 69/30 14/69.5 |
| 8,479,337 B1 | * | 7/2013 | Morris | A61G 3/061 14/69.5 |
| 8,844,083 B2 | * | 9/2014 | McGivern | E04F 11/002 14/69.5 |
| 9,803,381 B1 | * | 10/2017 | Bailie | E04F 11/1812 |
| 2013/0055511 A1 | * | 3/2013 | McGivern | E04F 11/002 14/69.5 |
| 2013/0104494 A1 | * | 5/2013 | Evangelista | H02G 3/125 52/741.1 |
| 2013/0198978 A1 | * | 8/2013 | Pohlman | E01D 1/00 14/69.5 |
| 2014/0150188 A1 | * | 6/2014 | Allen | E04F 11/002 14/69.5 |

(Continued)

FOREIGN PATENT DOCUMENTS

| | | | | |
|---|---|---|---|---|
| DE | 20204014275 | * | 1/2005 | |
| JP | 2002167933 A | * | 6/2002 | ............ E04F 11/002 |

(Continued)

*Primary Examiner* — Abigail A Risic
(74) *Attorney, Agent, or Firm* — Polsinelli PC

(57) ABSTRACT

A ramp assembly includes a decking system and a handrail system, an interface between the decking system and the handrail system, and a support system pivotably coupled to the interface. Other embodiments include a swivel bracket and a method of assembling a ramp assembly.

16 Claims, 7 Drawing Sheets

(56) References Cited

U.S. PATENT DOCUMENTS

2015/0176286 A1* 6/2015 Suggate ................ E04F 11/002
  14/69.5
2016/0251858 A1* 9/2016 Suggate ................ E04F 11/002
  14/69.5

FOREIGN PATENT DOCUMENTS

JP  2003213900 A * 7/2003 ............ E04F 11/002
JP  2007138480 A * 6/2007 ............ E04F 11/002

* cited by examiner

SUPPORT SYSTEM PIVOTING BRACKET AND RAMP ASSEMBLY INCLUDING SAME

CROSS-REFERENCE TO RELATED APPLICATION

This application claims the benefit of U.S. Provisional Application No. 62/574,659, filed Oct. 19, 2017, the disclosure of which is hereby incorporated by reference herein in its entirety.

BACKGROUND

Ramps and platforms are becoming increasingly common, due primarily to the recent passage of the Americans with Disabilities Act (ADA) requiring public buildings to be designed or modified to provide wheel chair access. These ramps and platforms assist those people confined to wheelchairs or who use walkers by providing a suitable pathway or rampway to the entrances of public and private buildings and stores, which may be at elevations above or below ground level. Since each site may be generally different from other sites, there is a need for ramp and platform assemblies that are modular in construction, and designed to minimize the cost and assembly time of at-site assembly.

Modular ramp and platform assemblies generally include deck surfaces, support posts, and handrails. These modular assemblies can be configured to provide ramping and horizontal deck surfaces to provide access, for example, if a user needs to travel from elevation A to elevation B, but is not able to traverse stairs or a steep slope to get there.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a ramp assembly is provided. The ramp assembly includes a decking system and a handrail system, and an interface between the decking system and the handrail system and a support system pivotably coupled to the interface.

In accordance with another embodiment of the present disclosure, a swivel bracket, comprising a first section defining an inner cavity for receipt of an elongate member and a second section adjacent the first section, the second section including an attachment section for swivel attachment to an object, wherein the first section is separated from the second section by a separator.

In accordance with another embodiment of the present disclosure, a method of assembling a ramp assembly is provided. The method includes coupling a decking system and a handrail system at an interface and pivotably coupling a support system to the interface.

In any of the embodiments described herein, the interface may be a saddle bracket.

In any of the embodiments described herein, the support system may be pivotably coupled to the saddle bracket by a swivel bracket.

In any of the embodiments described herein, the swivel bracket may include a first section having an inner cavity for receipt of a support leg, and a second section adjacent the first section, the second section configured for saddle bracket attachment, wherein the first section is separated from the second section.

In any of the embodiments described herein, the second section configured for saddle bracket attachment may include a first hole for stability attachment to the saddle bracket and a second hole for swivel attachment to the saddle bracket.

In any of the embodiments described herein, the first section may include an access port for passage of a tool through the inner cavity of the first section to the second section.

In any of the embodiments described herein, the second section may include a clamping device for clamping a support leg in the inner cavity.

In any of the embodiments described herein, the inner cavity may be configured to receive either a square or a circular support leg.

In any of the embodiments described herein, the second section configured for swivel attachment may include a first hole for stability attachment and a second hole for swivel attachment.

In any of the embodiments described herein, the first section may include an access port for passage of a tool through the first section to the second section.

In any of the embodiments described herein, the second section may include a clamping device for clamping a support leg in the inner cavity.

In any of the embodiments described herein, the inner cavity may be configured to receive either a square or a circular support leg.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following description sets forth one or more examples of a ramp and/or platform assembly and components thereof. Generally, embodiments described herein relate to modular ramp and platform assemblies that may include deck surfaces, support posts, and handrails. Additional embodiments relate to interfaces between components of the platform assembly, including, for example, the interface between the ramp section and the deck or platform section, the interface between the platform support posts and the handrail posts, etc.

As described in greater detail below, many of the components of the ramp and platform assembly may be formed from metal, for example, from extruded aluminum. Extruded aluminum construction generally reduces parts in the overall system, thereby reducing manufacturing and assembly costs, as well as operational noise generated by rattling part couplings. Moreover, extruded aluminum parts can be designed to achieve the same strength and stiffness requirements as steel construction, while having reduced weight over steel parts or parts made from other materials, allowing for improved ease of assembly and optimized part design.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Figure 1:
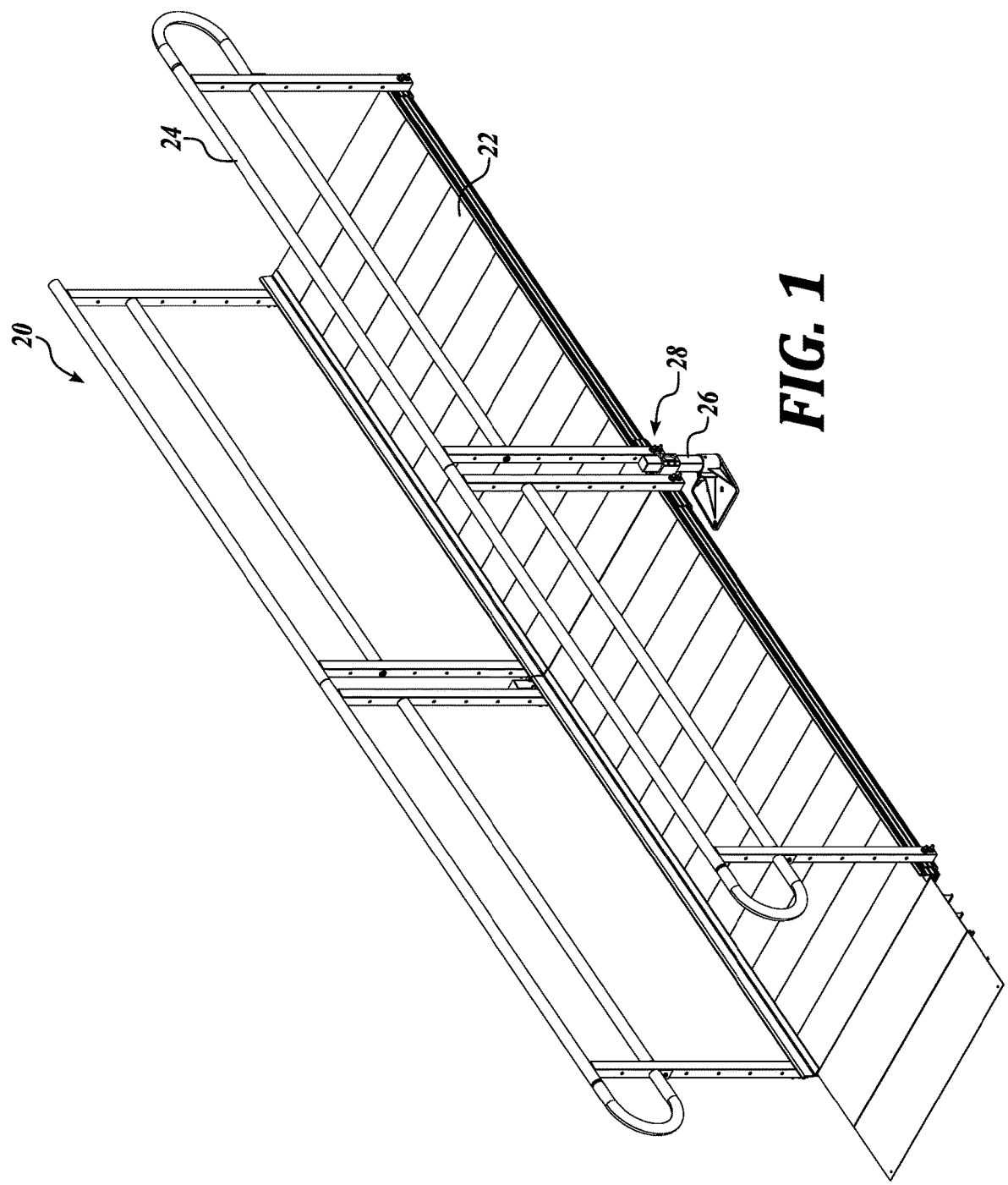
FIG. 1 is an isometric view of a ramp assembly in accordance with one embodiment of the present disclosure.

FIG. 1 illustrates an example of a ramp assembly, generally designated 20, formed in accordance with aspects of the present disclosure. In the embodiment shown in FIG. 1, the ramp assembly 20 includes a decking system 22, a handrail system 24 configured to couple with the decking system 22, a support system 26 configured to couple with the decking system 22, and an interface 28 between the handrail system 24, the support system 26, and the decking system 22.

In accordance with ADA requirements, the grade of the ramp must be within a certain rise to run ratio. Such ratio may vary for ramping deck surfaces depending on the rise and the distance between the desired high and low elevation points of the ramp. Therefore, adjustable interfaces are needed to adjust the support system 26 to properly couple with the decking system 22.

Figure 2A:
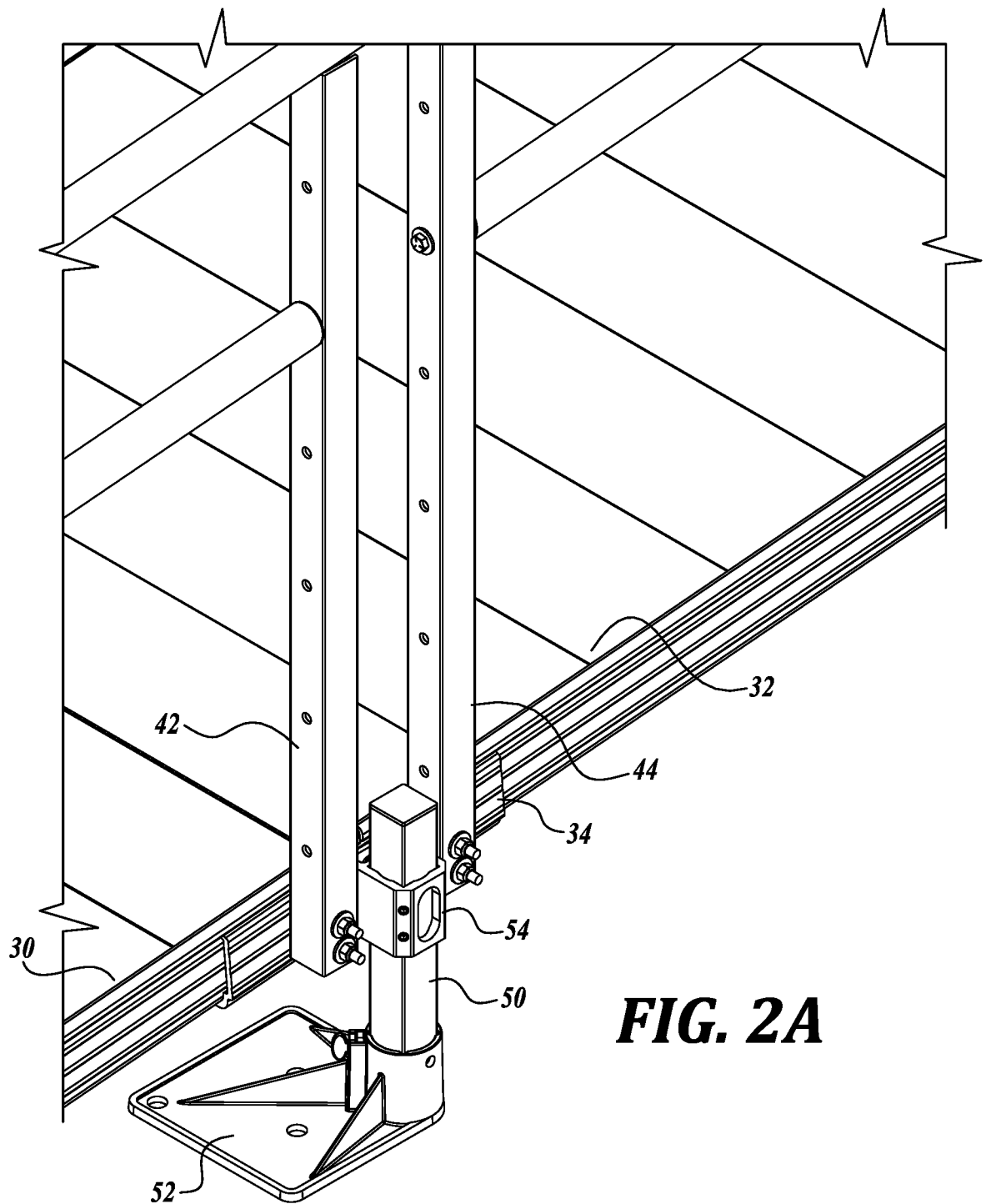
FIGS. 2A and 2B are respective close up isometric and side views of an interface between a decking system, a handrail system, and a support system of the ramp assembly of FIG. 1.
Figure 3A:
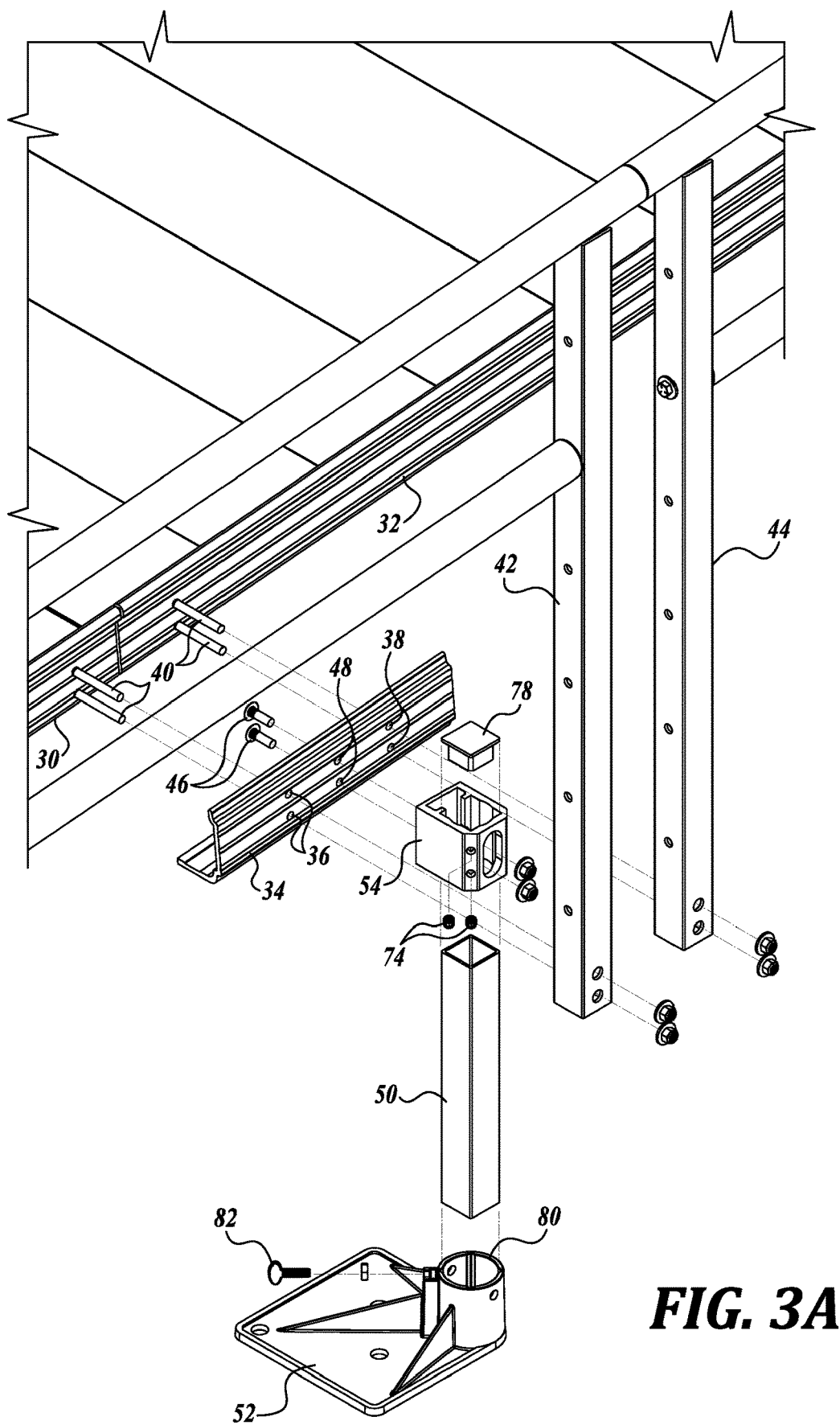
FIGS. 3A, 3B, and 3C are close-up isometric views of a method of assembling the ramp assembly of FIG. 1.

Referring to FIGS. 2A and 3A, the components of the ramp assembly 20 will be described. In the illustrated embodiment, the ramp assembly 20 includes a decking system 22 including first and second ramp platforms 30 and 32, which are coupled by a saddle bracket 34. (See FIG. 3A for an exploded view of the first and second platforms 30 and 32 and the saddle bracket 34). In the illustrated embodiment, the saddle bracket 34 adjoins the first and second ramp platforms 30 and 32 by ramp platform fasteners 40 extending through aligned holes in the first and second platforms 30 and 32 and in the saddle bracket 34.

The fasteners 40 extend from the first and second ramp platforms 30 and 32 through respective holes 36 and 38 in the saddle bracket 34 and through holes in the first and second handrail posts 42 and 44 of the handrail system 24 to couple the handrail system 24 to the decking system 22. (See FIG. 3B for coupled handrail posts 42 and 44.) The handrail system 24 is coupled to the desking system 22 at the same grade as the decking system 22, such that the handrails 46 and 48 are substantially parallel to the ramp platforms 30 and 32 to provide consistent handrail height and support to a user of the ramp assembly 20.

Figure 2B:
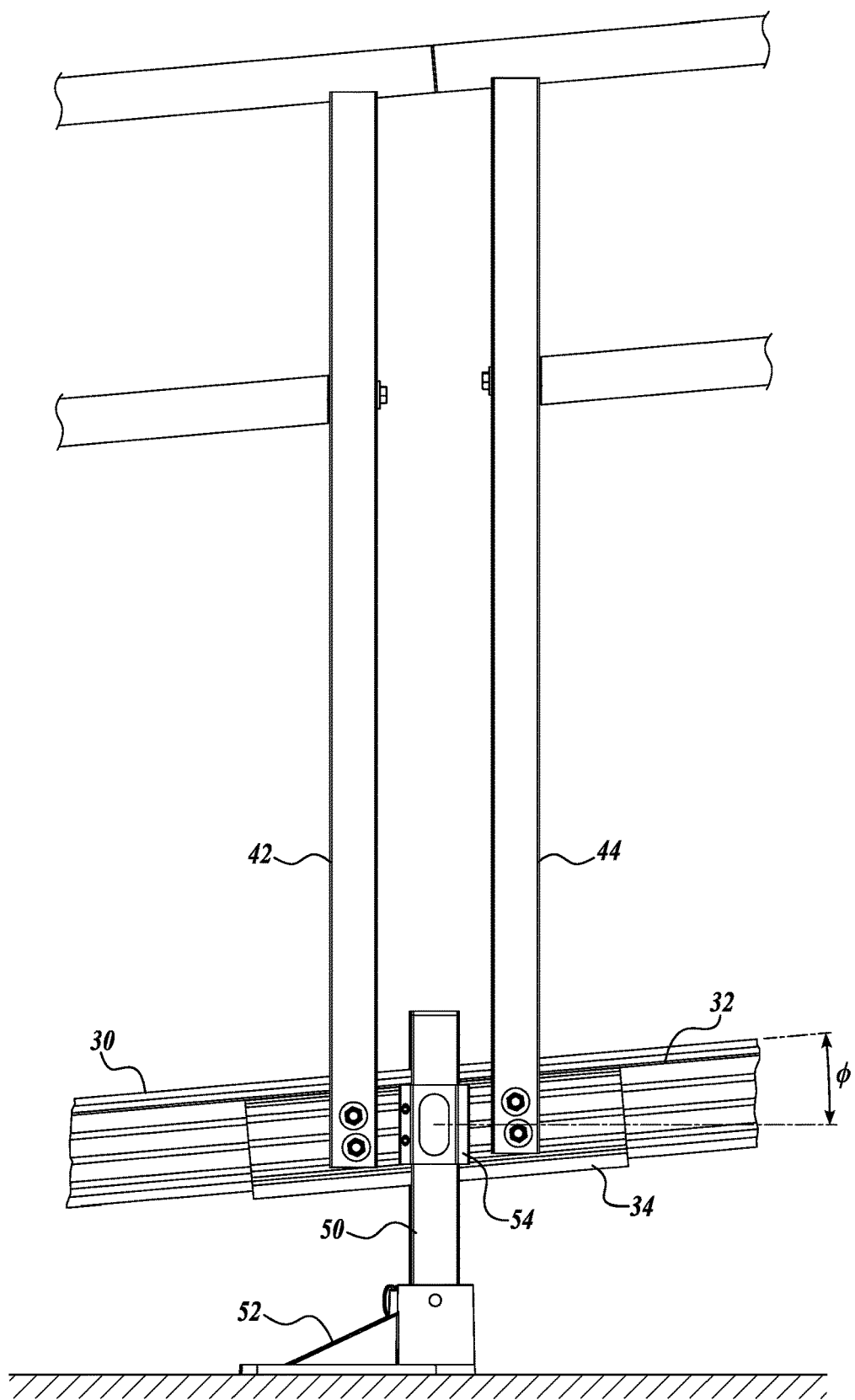

While the handrail system 24 runs at the same grade as the decking system 22, the support system 26 does not. In the illustrated embodiment, the support system 26 includes legs 50 and feet 52 to support the ramp assembly 20 from a ground surface. Referring to FIG. 2B, the support system 26 is coupled to the decking system 22 at an angle. Because the grade of the decking system 22 is not always consistent, and because the ground surface may or may not be level at all locations of support, adjustability at the site of assembly is needed in the attachment of the support system 26 to the decking system 22.

In the illustrated embodiment, a pivoting bracket 54 for receiving the leg 50 for attachment is provided. The pivoting bracket 54 attaches to the saddle bracket 34 by swivel attachment.

Figure 4A:
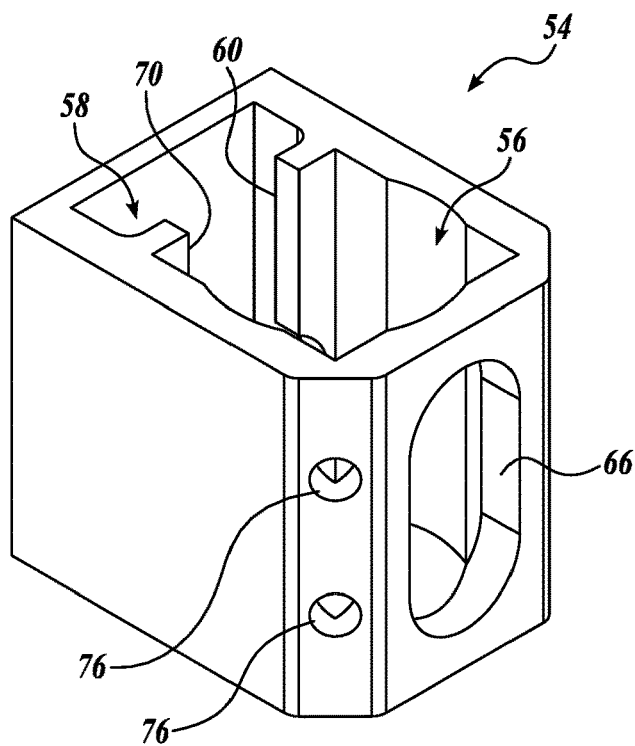
FIGS. 4A and 4B are isometric views of a swivel bracket of the ramp assembly of FIG. 1.
Figure 4B:
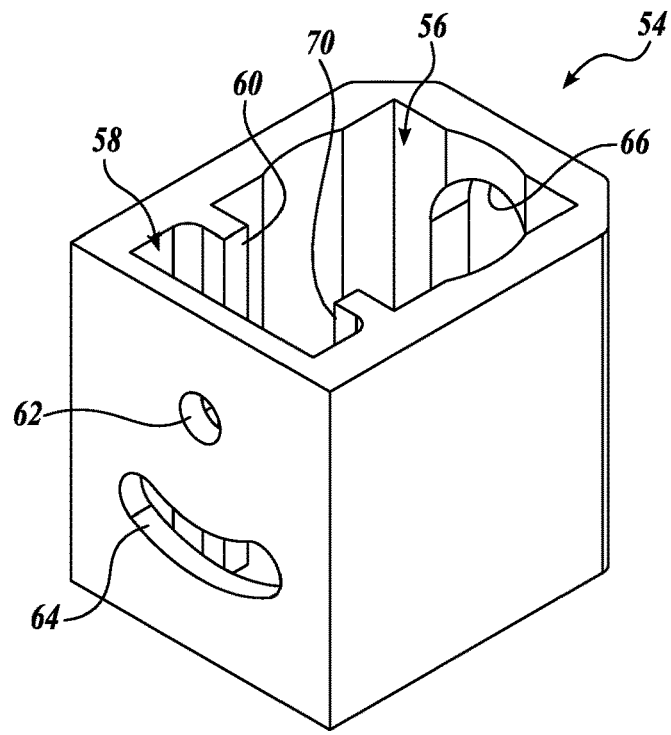

Referring to FIGS. 4A and 4B, details of the pivoting bracket 54 will now be described. The pivoting bracket 54 is generally a tubular bracket for receiving a leg 50 of the support system 26. The pivoting bracket 54 includes a first section 56 having inner cavity 68 for receiving a leg 50 and a second section 58 separated from the first section 56 for receiving fasteners 46.

The side-walls of the inner cavity 68 may be contoured to receive square or circular legs 50. In the illustrated embodiment, the sidewalls of the inner cavity 68 are contoured to receive either square or circular legs 50. The sidewalls of the inner cavity 68 of the illustrated embodiment form a square cavity for receipt of, for example, a leg having a square cross-section. However, the sidewalls of the inner cavity also include rounded portions to alternatively form a round cavity for receipt of, for example, a leg having a circular cross-section. The cavity may be designed for the receipt of other shaped legs.

The first and second sections 56 and 58 are separated by a separation. In the illustrated embodiment, the separation includes partially extending walls 60 which form structure to receive a leg through the inner cavity 68 of the first section 56, but which define a through-space 70 between the first and second sections 56 and 58.

Referring to FIG. 4B, the second section 58 of the pivoting bracket 54 includes first and second attachment holes 62 and 64 for attachment to two support fasteners 46 extending from the saddle bracket 34. (See FIGS. 3A and 3B for a view of the support fasteners 46 extending from the saddle bracket 34.) The first attachment hole 62 in the pivoting bracket 54 is a non-swiveling attachment hole providing stability to the connection.

The second attachment hole 64 in the pivoting bracket 54 is a swivel hole, which allows the pivoting bracket 54 to swivel relative to the saddle bracket 34 (and by extension, relative to the decking system 22). Such swiveling allows the pivoting bracket 60 to achieve the correct angle relative to the decking system 22 for proper leg support before the pivoting bracket is fastened.

The second section 58 of the pivoting bracket 54 allows for fastener attachment of the pivoting bracket 54 to the decking system 22 without the fasteners interfering with the inner cavity 68 of the first section 56 of the pivoting bracket 54, which needs to remain clear and open for receiving a leg 50.

A tool insert hole or access port 66 is provided in the first section 56 of the pivoting bracket 54 to allow a tool to enter the inner cavity of the pivoting bracket 54 and through the through space 70 between the first and second sections 56 and 58 of the pivoting bracket 54. Such passage allows for a tool to adjust the fasteners 46 received in the first and second attachment holes 62 and 64.

Corner fasteners 74 received in corner fastener holes 76 of the pivoting bracket 54 (see FIG. 3C) allows for a leg 50 to be clamped in position in the pivoting bracket 54 at a desired leg height. Such corner fasteners 74 are shown as set screws in the illustrated embodiment and can be used to clamp a leg having either a square or circular cross-section.

Figure 3B:
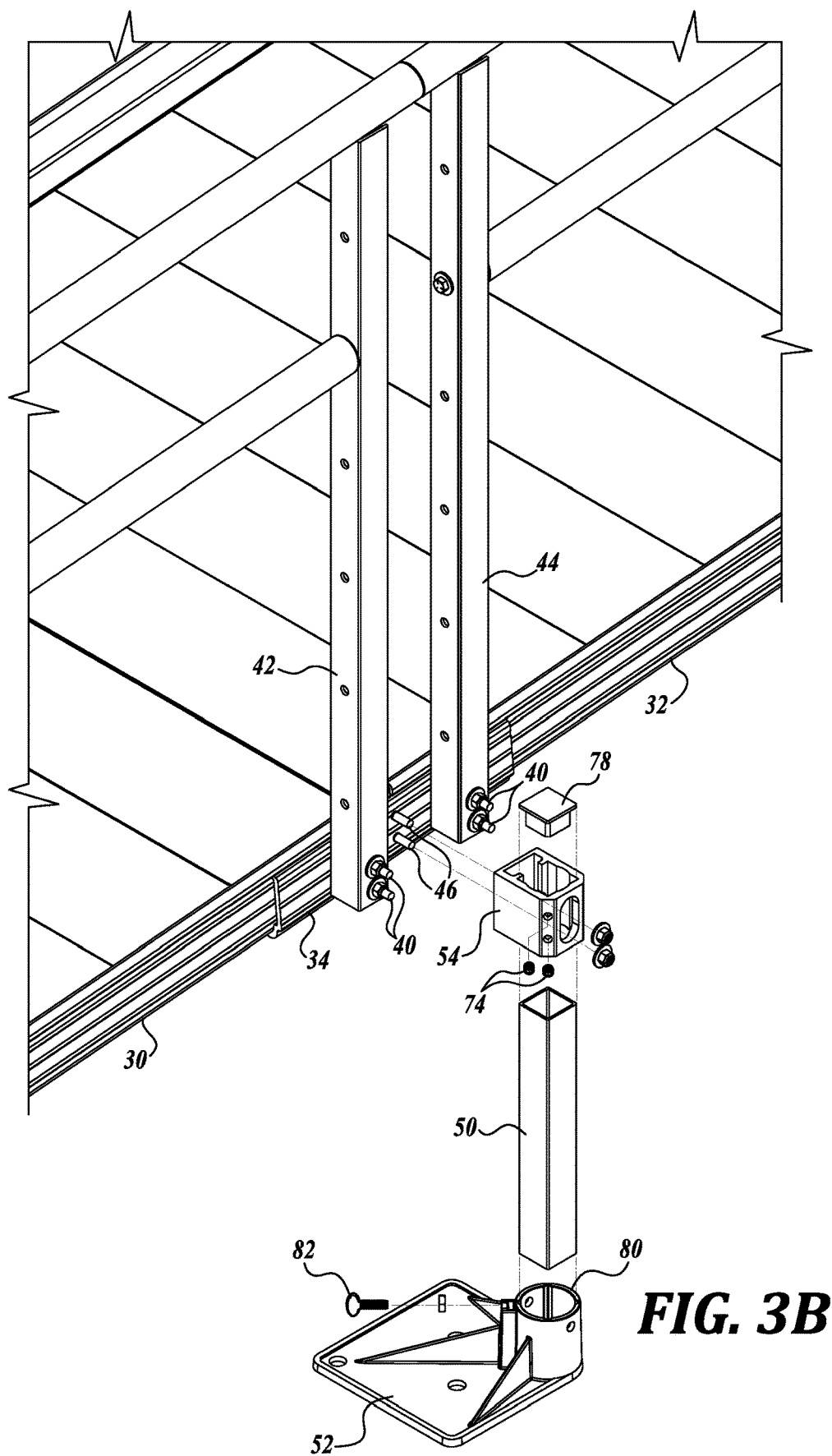

With reference to the series of FIGS. 3A, 3B, 3C, and 2A, a method of assembling the ramp assembly 20 will now be described. Referring to FIG. 3A, the first and second ramp platforms 32 and 34 of the decking system 22 are aligned and supported by a saddle bracket 34. Handrail fasteners 40 extend through holes in the respective first and second ramp platforms 32 and 34, then through first and second sets of holes 36 and 38 holes in the saddle bracket 34, and then through holes in the first and second handrail posts 42 and 44. As seen in FIG. 3B, the handrail fasteners 40 attach these components together.

Prior to the coupling of the handrail fasteners 40, support fasteners 46 are inserted into the support fastener holes 48 of the saddle bracket 34 (see FIG. 3A). After the first and second handrail posts 42 and 44 are coupled to the decking system 22 (see FIG. 3B), the swivel bracket 54 can be attached to the support fasteners 46. The swivel bracket 54 is attached by swiveling to achieve the desired relationship between the grade of the decking system 22 and the legs 50 of the support system 26. Such swivel is achieved by the adjustability of the second swivel hole 64 of the swivel bracket 54. Attachment of the swivel bracket 54 to the saddle bracket 34 is achieved by reaching a tool through the tool insert hole 60 and the through space 70 of the swivel bracket 54.

Figure 3C:
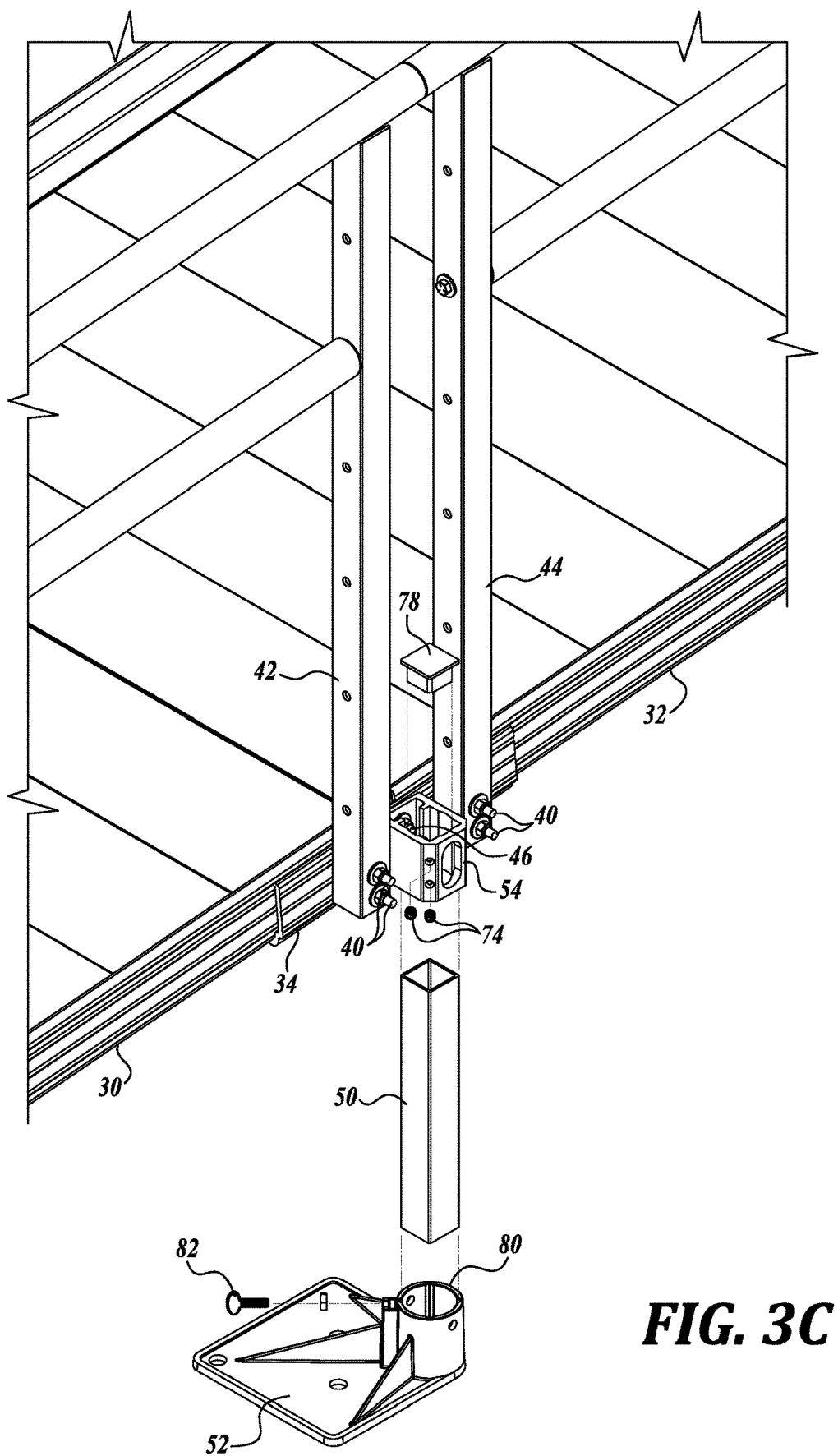

After the swivel bracket 54 has been attached in a proper orientation relative to the decking system 22 (see FIG. 3C, and see also FIG. 2B), the support system 26 (including legs 50 and 52) can be attached to the swivel bracket 54 to provide support for the ramp assembly 20. Referring to FIG. 3C, a leg 50 is inserted in the inner cavity 68 of the swivel bracket 54, which is configured for receiving such leg 50. Corner fasteners 74 (shown as set screws) received in corner fastener holes 76 of the pivoting bracket 54 clamp the leg 50 in position in the pivoting bracket 54 at a desired leg height. A foot 52 receives the bottom end of the leg 50 and provides support for the leg 50. The leg 50 is clamped in a leg receiving portion 80 of the foot 52 by a clamping device 82 shown as a set screw. A leg cap 78 is inserted at the top end of the leg 50.

The swivel support attachment of the present disclosure provides advantages over previous designs by simplifying the interface 28 between the handrail system 24, the support system 26, and the decking system 22. In addition, the swivel support attachment simplifies the adjustments needed for attachment of the support system 26 to the decking system 22 to simplify assembly of the ramp assembly 20.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A ramp assembly, comprising:
a decking system;
an elongate support member for the decking system; and
an interface between the decking system and the elongate support member, wherein the interface includes a swivel bracket, the swivel bracket including a first section defining an inner cavity having a first open end and a second open end and a first access port into the first section, and a second section adjacent the first section, the second section including an attachment section for swivel attachment to the decking system, wherein the first section is separated from the second section by a separator, wherein the separator includes a second access port aligned with the first access port and the attachment section to allow for passage of a tool through the first section and the second section to the attachment section, wherein the elongate support member is configured to be received within the inner cavity of the first section of the swivel bracket.

2. The ramp assembly of claim 1, wherein the decking system includes a saddle bracket.

3. The ramp assembly of claim 2, wherein the elongate support member is pivotably coupled to the saddle bracket by the swivel bracket.

4. The ramp assembly of claim 1, wherein the attachment section includes a first hole configured for stability attachment to the decking system and a second hole configured for swivel attachment to the decking system.

5. The ramp assembly of claim 1, wherein the first section includes a clamping device for clamping the elongate support member in the inner cavity.

6. The ramp assembly of claim 1, wherein the inner cavity is configured to receive the elongate support member having either a square or a circular cross-sectional shape.

7. The ramp assembly of claim 1, further comprising a handrail system coupled to the decking system.

8. The ramp assembly of claim 1, wherein the swivel bracket includes an outer wall.

9. The ramp assembly of claim 8, wherein the first access port is in the outer wall.

10. The ramp assembly of claim 8, wherein the attachment section is in the outer wall.

11. A swivel bracket, comprising:
an outer wall defining a first section defining an inner cavity having a first open end and a second open end, the inner cavity configured for receipt of an elongate support member, the outer wall including a first access port into the first section, and a second section adjacent the first section, the second section including an attachment section in the outer wall for swivel attachment to an object, wherein the first section is separated from the second section by a separator, wherein the separator includes a second access port aligned with the first access port and the attachment section to allow for passage of a tool through the first section and the second section to the attachment section.

12. The swivel bracket of claim 11, wherein the attachment section includes a first hole configured for stability attachment and a second hole configured for swivel attachment.

13. The swivel bracket of claim 11, wherein the first section includes a clamping device for clamping the elongate support member in the inner cavity.

14. The swivel bracket of claim 11, wherein the inner cavity is configured to receive the elongate support member having either a square or a circular cross-sectional shape.

15. A method of assembling a ramp assembly, the method comprising:

coupling a decking system and a support system at an interface, wherein the interface includes a swivel bracket, the swivel bracket including a first section defining an inner cavity having a first open end and a second open end and a first access port into the first section, and a second section adjacent the first section, the second section including an attachment section for swivel attachment to the decking system, wherein the first section is separated from the second section by a separator, wherein the separator includes a second access port aligned with the first access port and the attachment section;

receiving the support system in the inner cavity of the swivel bracket;

aligning the swivel bracket to achieve a desired angle between the decking system and the support system by pivoting the attachment section; and passing a tool through the first access port of the first section and the second access port of the second section to the attachment section of the swivel bracket to secure the decking system to the support system at the desired angle.

16. The method of claim 15, wherein the decking system includes a saddle bracket, and attaching the swivel bracket to the saddle bracket.

* * * * *